(12) United States Patent
Inai et al.

(10) Patent No.: US 11,302,106 B2
(45) Date of Patent: Apr. 12, 2022

(54) INFORMATION PROVISION SYSTEM (71) Applicant: HONDA MOTOR CO., LTD., Tokyo (JP)

(72) Inventors: Yukari Inai, Wako (JP); Shohei Suzuki, Tokyo (JP); Shimpei Shikanai, Wako (JP); Yasuko Nakajima, Tokyo (JP); Takayuki Haramoto, Wako (JP); Tatsuya Ryuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 16/463,559

(22) PCT Filed: Dec. 28, 2016

(86) PCT No.: PCT/JP2016/089197
§ 371 (c)(1),
(2) Date: May 23, 2019

(87) PCT Pub. No.: WO2018/123057
PCT Pub. Date: Jul. 5, 2018

(65) Prior Publication Data
US 2019/0377961 A1 Dec. 12, 2019

(51) Int. Cl.
*G06K 9/00* (2022.01)
*G01C 21/34* (2006.01)
(Continued)

(52) U.S. Cl.
CPC ....... *G06V 20/597* (2022.01); *G01C 21/3484* (2013.01); *G01C 21/3697* (2013.01); *G07C 5/008* (2013.01); *G08G 1/096791* (2013.01)

(58) Field of Classification Search
CPC ............ G06K 9/00845; G01C 21/3484; G01C 21/3697; G07C 5/008; G08G 1/096791
(Continued)

(56) References Cited

U.S. PATENT DOCUMENTS 6,243,015 B1 * 6/2001 Yeo .................... G08B 21/06
340/575
7,138,922 B2 * 11/2006 Strumolo ............... G08B 21/06
340/575

(Continued)

FOREIGN PATENT DOCUMENTS

CN    102024157 A  *  4/2011 ............. G10L 17/00
JP    2003210833 A  *  7/2003
(Continued)

OTHER PUBLICATIONS

M.T. Quazi et al., "Towards the Smart Sensors Based Human Emotion Recognition," 2012, Publisher: IEEE.*
(Continued)

*Primary Examiner* — Tuan C To
(74) *Attorney, Agent, or Firm* — Rankin, Hill & Clark LLP (57) ABSTRACT

An information provision system that allows appropriate information provision suited for a user who is a driver. The information provision system includes: an emotion information database that records emotion information detected by an emotion detection part that detects emotion of a user and outside information being associated with the emotion information; and a browsing information generation part that generates browsing information when a predetermined emotion kind is detected by the emotion detection means.

3 Claims, 8 Drawing Sheets

(51) Int. Cl.
  *G01C 21/36*  (2006.01)
  *G08G 1/0967*  (2006.01)
  *G07C 5/00*  (2006.01)
  *G06V 20/59*  (2022.01)

(58) Field of Classification Search
  USPC .......................................................... 701/1
  See application file for complete search history.

(56) References Cited

U.S. PATENT DOCUMENTS

| | | | | |
|---|---|---|---|---|
| 7,719,431 | B2 * | 5/2010 | Bolourchi ............ | B60K 28/066 340/576 |
| 8,986,218 | B2 * | 3/2015 | De Lemos ............ | A61B 5/163 600/558 |
| 9,050,045 | B2 * | 6/2015 | Mori ...................... | A61B 5/165 |
| 10,163,362 | B2 * | 12/2018 | Uno ...................... | G06F 3/0482 |
| 2002/0109602 | A1 * | 8/2002 | Shinada ................ | G09B 19/00 340/576 |
| 2005/0075532 | A1 * | 4/2005 | Lee ....................... | A61M 21/00 600/27 |
| 2006/0094934 | A1 * | 5/2006 | Shirai .................... | A61B 5/01 600/300 |
| 2014/0004489 | A1 * | 1/2014 | Kim ...................... | G09B 19/00 434/236 |
| 2014/0287387 | A1 * | 9/2014 | Vukasinovic ........... | G09B 7/02 434/236 |
| 2015/0278696 | A1 * | 10/2015 | Moon ................ | G06Q 10/0637 706/46 |
| 2015/0356876 | A1 * | 12/2015 | Wang ...................... | G09B 5/06 434/236 |
| 2016/0217321 | A1 * | 7/2016 | Gottlieb ............. | G06K 9/00308 |
| 2016/0317099 | A1 * | 11/2016 | Kawai .................... | A47C 31/00 |
| 2017/0068994 | A1 * | 3/2017 | Slomkowski ....... | G06Q 30/0269 |
| 2017/0083757 | A1 * | 3/2017 | Enomoto ................ | G06F 3/011 |
| 2018/0075490 | A1 * | 3/2018 | Chintalapoodi ... | G06Q 30/0261 |
| 2018/0124242 | A1 * | 5/2018 | Zimmerman ........... | G06F 40/35 |
| 2020/0012651 | A1 * | 1/2020 | Matsuda ............. | G06F 16/2291 |

FOREIGN PATENT DOCUMENTS

| | | | | |
|---|---|---|---|---|
| JP | 2005-303734 | | 10/2005 | |
| JP | 2006-227236 | | 8/2006 | |
| JP | 2007264284 | A * | 10/2007 | |
| JP | 4421929 | | 2/2010 | |
| JP | 4604360 | B2 * | 1/2011 | |
| JP | 5515192 | | 6/2014 | |
| KR | 20140003305 | A * | 1/2014 | |
| RU | 2011125782 | A * | 12/2012 | |
| RU | 2529402 | C1 * | 9/2014 | |
| WO | WO-2014112362 | A1 * | 7/2014 | ............ H04L 51/32 |
| WO | WO-2016035268 | A1 * | 3/2016 | ............ B60W 30/14 |
| WO | 2016/121174 | | 8/2016 | |

OTHER PUBLICATIONS

Yunfan et al., "Facial Expression Recognition and Generation using Sparse Autoencoder," 2014, Publisher: IEEE.*
International Preliminary Report on Patentability dated Jul. 11, 2019, 7 pages.
International Search Report, dated Apr. 4, 2017 (Apr. 4, 2017), 2 pages.
Indian Office Action dated May 24, 2021, 6 pages.
Lukowicz, et al. "WearNET: A Distributed Multi-sensor System for Context Aware Wearables", Wearable Computing Lab, ETH Zurich, Switzerland, 2002, 10 pages.
Indonesian Office Action dated Apr. 20, 2021, English translation included, 4 pages.
Chinese Office Action dated Apr. 2, 2021, English abstract included, 13 pages.

* cited by examiner

| USER | USER A | USER A | USER A | |
|---|---|---|---|---|
| EMOTION KIND | DELIGHTFUL (POSITIVE) | TOILSOME (NEGATIVE) | JOY (POSITIVE) | |
| TIMING | DURING DRIVING | DURING DRIVING | DURING DRIVING | |
| OUTSIDE SITUATION | SPOT A SHINE 20°C OUTSIDE SOUND: QUIET COMPANION: ABSENT | SPOT B CLOUDINESS 15°C OUTSIDE SOUND: QUIET COMPANION: ABSENT | SPOT C SHINE 18°C OUTSIDE SOUND: QUIET COMPANION: ABSENT | ----- |
| IMAGE INFORMATION | | | | |

PERSONALITY: ACTIVE

| USER | USER A | USER B | USER A | USER D | USER C | USER A |
|---|---|---|---|---|---|---|
| EMOTION KIND | DELIGHTFUL (POSITIVE) | DELIGHTFUL (POSITIVE) | JOY (POSITIVE) | JOY (POSITIVE) | TOILSOME (NEGATIVE) | TOILSOME (NEGATIVE) |
| TIMING | DURING DRIVING | DURING DRIVING | DURING BROWSING | DURING BROWSING | DURING DRIVING | DURING DRIVING |
| OUTSIDE SITUATION | SPOT A / SHINE / 20°C / OUTSIDE SOUND: QUIET / COMPANION: ABSENT | SPOT B / SHINE / 20°C / OUTSIDE SOUND: QUIET / COMPANION: PRESENT | SPOT C / SHINE / 25°C / OUTSIDE SOUND: QUIET / COMPANION: ABSENT | SPOT A / SHINE / 25°C / OUTSIDE SOUND: QUIET / COMPANION: ABSENT | SPOT C / CLOUDINESS / 15°C / OUTSIDE SOUND: NOISY / COMPANION: ABSENT | SPOT D / CLOUDINESS / 10°C / OUTSIDE SOUND: NOISY / COMPANION: PRESENT |

INFORMATION PROVISION SYSTEM

TECHNICAL FIELD

The present invention relates to an information provision system.

BACKGROUND ART

Conventionally, there has been proposed a navigation system which automatically searches a path leading to a designated destination and performs guiding. Such a navigation system searches a route on which a traveling distance and a traveling time from a current location to the designated destination are the shortest, presents a search result to a user, and performs route guiding based on the search result for the user.

Conventionally, as the above-mentioned system, disclosed is a technology in which a user identification part for identifying a plurality of users who are acting together; an estimation part for estimating relationship of the identified plurality of users; and a generation part for generating guide information for the plurality of users in accordance with the relationship of the estimated plurality of users are included and in consideration of the relationship of the plurality of users, and further optimum guide information is generated (for example, refer to Patent Literature 1).

CITATION LIST

Patent Literature

Patent Literature 1
International Patent Publication No. WO 2016/121174

SUMMARY OF INVENTION

Technical Problem

However, although the above-mentioned navigation system only handles emotion as one detection parameter and proposes a route, further utilization of emotion information has become the challenge.

Therefore, an object of the present invention is to provide a system which allows emotion information of a user to be utilized for browsing information.

Solution to Problem

To achieve the above object, an information provision system according to an aspect of the present invention includes: emotion information record means (64) recording emotion information and outside information, the emotion information being detected by emotion detection means (70) detecting emotion of a user (3), and the outside information being associated with the emotion information; and browsing information generation means (72), when predetermined emotion kinds are detected by the emotion detection means (70), generating browsing information based on the outside information.

In the above-described configuration, the emotion detection means (70) detects an emotion level for each emotion kind, and the browsing information generation means (72), when the emotion level changes and exceeds a predetermined range, may generate the browsing information.

In the above-described configuration, the browsing information generation means (72) may transmit the generated browsing information to another user (3) being different from the user (3).

In the above-described configuration, the emotion detection means (70) may detect for each emotion kind, an emotion of the other user (3) being different and when the emotion becomes a predetermined emotion kind, the emotion detection means (70) may associate emotion information of the other user (3) being different with the outside information and may record the emotion information of the user (3) associated with the outside information in the emotion information record means (64).

Advantageous Effects of Invention

In the present invention, the emotion information record means which records the emotion information detected by the emotion detection means detecting emotion of a user and the outside information associated with the emotion information; and the browsing information generation means, when a predetermined emotion kinds are detected by the emotion detection means, which generates the browsing information based on the outside information are included. Thus, the browsing information in which the outside information upon achieving the predetermined emotion kinds has been recorded can be obtained.

In addition, the emotion detection means detects the emotion level for each emotion kind, and the browsing information generation means, when the emotion level changes and exceeds a predetermined range, generates the browsing information. Thus, the browsing information in which the outside information has been recorded when each of the emotion levels has exceeded the predetermined value can be obtained.

In addition, the browsing information generation means transmits the generated browsing information to another user who is different from the user. Thus, the other user who is different from the user can confirm the browsing information obtained when each of the emotion levels has exceeded the predetermined value.

The emotion detection means detects for each emotion kind, an emotion of the other user who is different from the user and browsing the outside information and when the emotion becomes a predetermined emotion kind, the emotion detection means associates the emotion information of the other user, who is different from the user, with the outside information and records the emotion information associated with the outside information in the emotion information record means. Thus, the emotion information and the outside information of other user who is browsing the browsing information can be recorded so as to be associated with the outside information.

DESCRIPTION OF EMBODIMENT

Hereinafter, with reference to the accompanying drawings, an embodiment of the present invention will be described.

Figure 1:
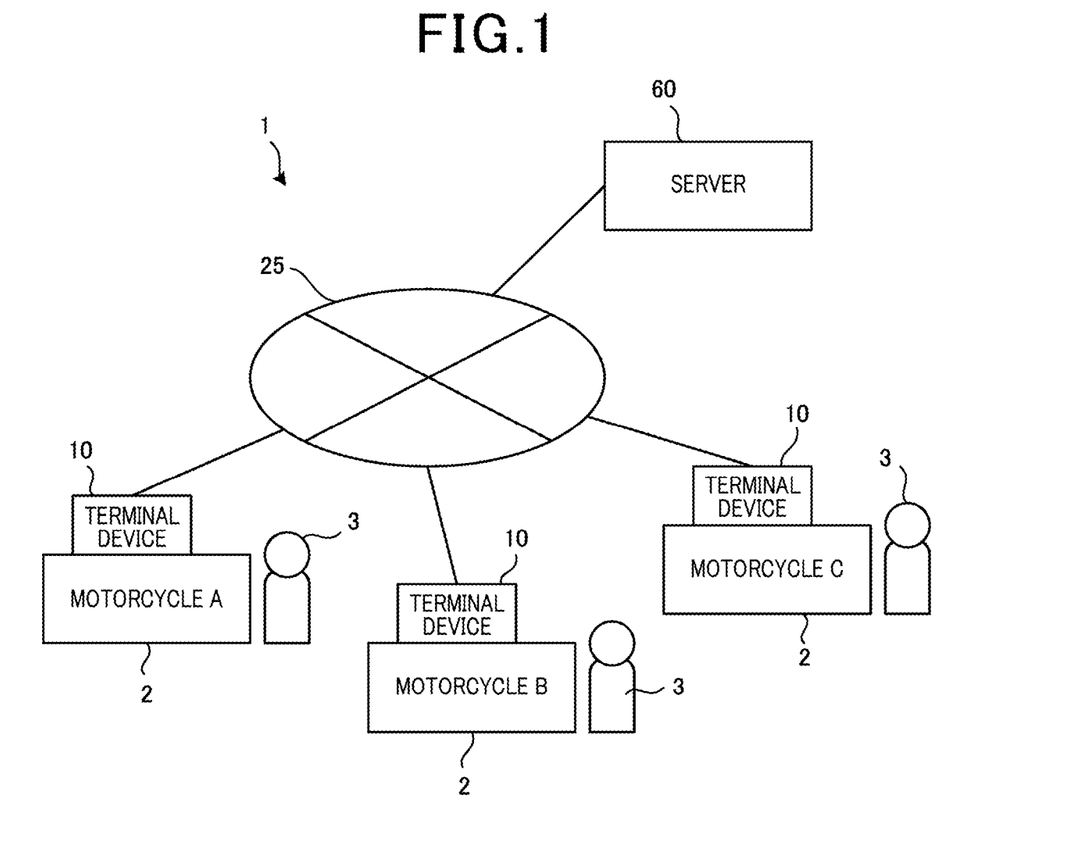
FIG. 1 is a diagram showing an information provision system according to an embodiment of the present invention.

FIG. 1 is a diagram showing an information provision system according to the embodiment of the present invention.

An information provision system 1 includes a terminal device 10 which is mounted on each motorcycle 2 as a vehicle and a server 60 which can communicate with the terminal device 10 via a communication network 25 and is a system which sets a route suited for a user 3 who is a driver of the motorcycle 2 or provides the user 3 with information pertinent to a route record.

The communication network 25 is a wide area communication network 25 which can wirelessly communicate with the terminal device 10 while the motorcycle 2 is running. The communication network 25 may be an open network such as the Internet or may be a closed communication network. When the communication network 25 is the open network, the terminal device 10 and the server 60 may execute secure communication on the communication network 25 by using a VPN (Virtual Private Network) technology or the like. Note that a network configuration and a communication protocol of the communication network 25 are not particularly limited.

Figure 2:
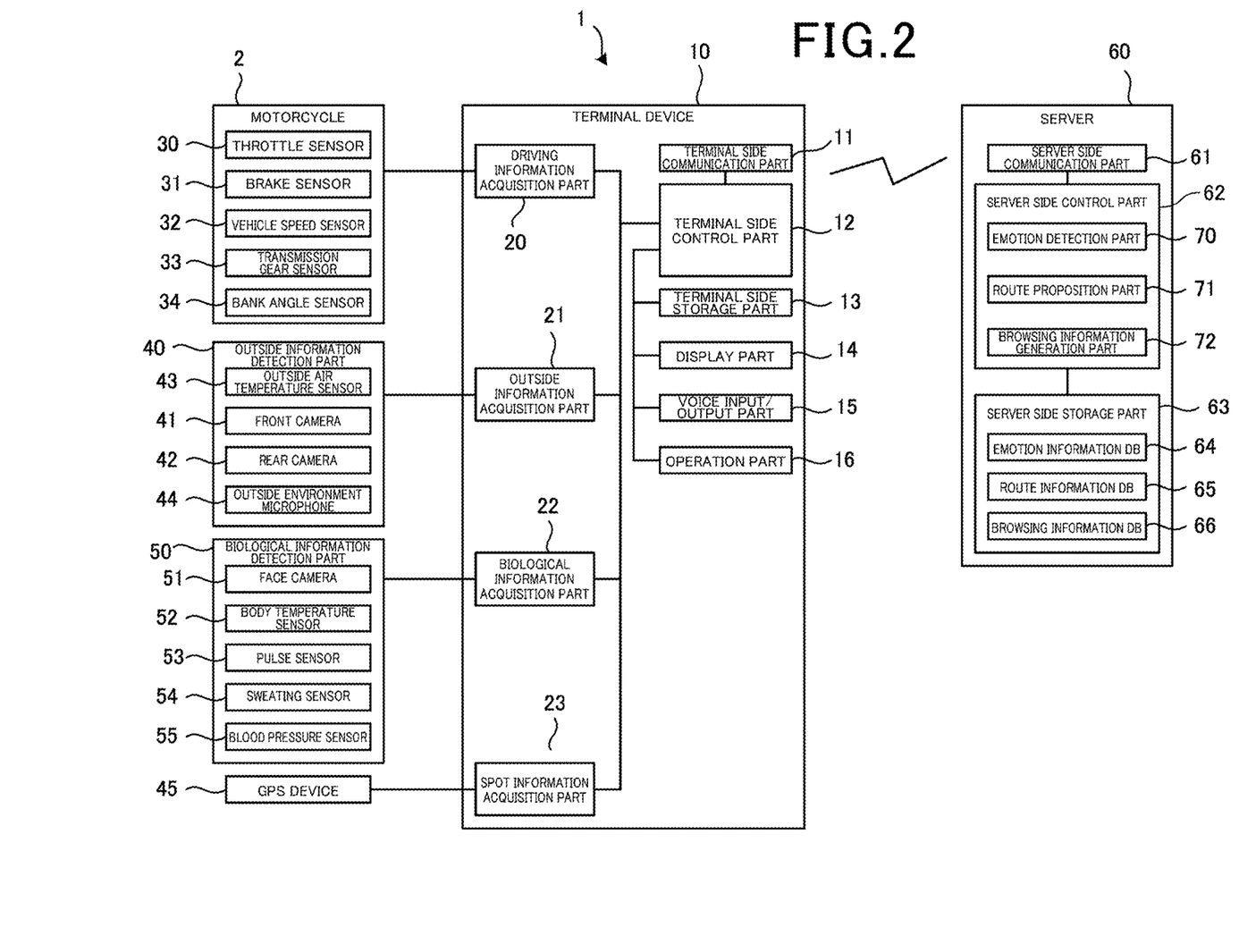
FIG. 2 is a block diagram showing hardware configurations of a terminal device and a server.

FIG. 2 is a block diagram showing hardware configurations of the terminal device 10 and the server 60.

The terminal device 10 includes a terminal side communication part 11, a terminal side control part 12, a terminal side storage part 13, a display part 14, a voice input/output part 15, an operation part 16, a driving information acquisition part 20, an outside information acquisition part 21, a biological information acquisition part 22, and a spot information acquisition part 23. The terminal side communication part 11 performs communication processing in accordance with a wireless communication protocol under control of the terminal side control part 12, thereby communicating with the server 60 via the communication network 25.

The terminal side control part 12 is constituted of a processor and peripheral circuitry and executes programs stored in the terminal side storage part 13 by the processor, thereby functioning as a computer unit which controls each part of the terminal device 10 and performs processing for realizing a variety of kinds of functions.

The terminal side storage part 13 has stored therein programs and data required in order for the terminal device 10 to perform a variety of kinds of processing. As this terminal side storage part 13, a heretofore known storage device is widely applicable.

The data stored in the terminal side storage part 13 includes pieces of identification information which allow the terminal device 10, the motorcycle 2 to which this terminal device 10 is attached, and the user 3 who drives the motorcycle 2 to be identified. These pieces of identification information are transmitted to the server 60, thereby allowing the terminal device 10, the motorcycle 2, and the user 3 to be identified on a side of the server 60.

The display part 14 is constituted of, for example, a display panel such as a liquid crystal panel or an organic EL (Electro-Luminescence) panel. The display panel is used, thereby allowing a wide variety of pieces of information to be communicated by using any image such as characters and graphics.

The display part 14 notifies information of the user 3 through displaying under the control of the terminal side control part 12.

The voice input/output part 15 outputs voice such as synthesized voice from a speaker, not shown, under the control of the terminal side control part 12 and picks up voice of the user 3 via a microphone, not shown. In addition, the voice input/output part 15 notifies information of the user 3 through voice under the control of the terminal side control part 12.

In addition, in the present embodiment, each of the parts of the terminal device 10 (the terminal side control part 12, the voice input/output part 15, the display part 14, and the like) and the server 60 operates in conjunction with each other, thereby enabling a dialogue with the user 3.

The operation part 16 includes an operator which accepts a variety of operations made by the user 3 or the like and outputs an operation on the operator to the control part. As the operator, a plurality of hardware switches, a touch panel, provided for the display part 14, or the like is applicable. By using this operation part 16, the pieces of identification information which allow the terminal device 10, the motorcycle 2, and the user 3 to be identified can be set externally and desired information can be inputted.

The driving information acquisition part 20 acquires information pertinent to driving (hereinafter, driving information), outputted from the motorcycle 2, and outputs the acquired driving information to the terminal side control part 12.

The motorcycle 2 includes a throttle sensor 30, a brake sensor 31, a vehicle speed sensor 32, a transmission gear sensor 33, and a bank angle sensor 34.

The throttle sensor 30 detects a throttle opening of the motorcycle 2. The brake sensor 31 detects presence or absence of front and rear brake operations of the motorcycle 2. The transmission gear sensor 33 detects a currently used transmission gear of the motorcycle 2. The vehicle speed sensor 32 detects a current vehicle speed of the motorcycle 2. The bank angle sensor 34 detects a current inclination of the motorcycle 2.

The detection results obtained by these throttle sensor 30, brake sensor 31 vehicle speed sensor 32, transmission gear sensor 33, and bank angle sensor 34 are outputted as the driving information to the driving information acquisition part 20.

Based on the detection results sent from the motorcycle 2, the driving information acquisition part 20 can also acquire acceleration of the motorcycle 2. Further, when the motorcycle 2 includes a TCS (traction control system), information on whether or not the TCS has operated is also included, and when the motorcycle 2 includes an ABS (Antilock Brake System), information on whether or not the ABS has operated is also included.

Based on these acquired pieces of driving information, the driving information acquisition part 20 can determine whether the motorcycle 2 is being driven in a stable state or an unstable state. In addition, it is also made possible to determine emotion and attributes of the user based on the pieces of driving information.

Note that the pieces of driving information are not limited to the above-described pieces of information, and for example, any piece of information such as pieces of information which are pertinent to operations of an operation system, such as a blinker switch and a headlight switch, of the motorcycle 2 and information of a mode selector for selecting a driving mode can be added.

An outside information detection part 40 includes a front camera 41 for shooting an area ahead of the motorcycle 2, a rear camera 42 for shooting an area behind the motorcycle 2, a temperature sensor 43 for detecting a temperature, and an outside environment microphone 44.

The front camera 41 and the rear camera 42 may be mounted on the motorcycle 2, or may be mounted on the terminal device 10, or may be mounted on a helmet.

The front camera 41 shoots a landscape ahead of the motorcycle 2, a vehicle running ahead of the motorcycle 2, for example, conditions of a traveling road such as a straight-ahead road and a curving road, weather at the time of running, and the like. The rear camera 42 shoots a landscape behind the motorcycle 2, a vehicle running behind the motorcycle 2, weather at the time of running, and the like.

Images shot by the front camera 41 and the rear camera 42 are outputted to the outside information acquisition part 21 of the terminal device 10. The outside information acquisition part 21 analyzes the sent images, thereby acquiring information pertinent to an outside ahead of or behind the motorcycle 2.

Note that instead of the front camera 41 and the rear camera 42 or in addition to the front camera 41 and the rear camera 42, a radar device may be provided or scanning which uses radio waves, infrared rays, laser, or the like may be performed, thereby acquiring the outside information.

In addition, as the outside information, information other than the information acquired by the outside information detection part 40 mounted on the vehicle, that is, information from the server 60 or the terminal device 10 via the communication network 25 may be obtained. Further, information may be obtained from a terminal device 10 which another user 3 has. In this case, for example, pieces of information such as weather, a temperature, and road conditions in other region in which driving is going to be made can be obtained from the server 60, and outside information acquired by the terminal device 10 which the other user 3 has can be obtained. Thus, it becomes convenient, for example, when the outside information cannot be acquired by the terminal device 10 of the user 3.

The temperature sensor 43 detects a temperature outside the motorcycle 2 and outputs the detected temperature to the outside information acquisition part 21. The temperature sensor 43 may be mounted on the motorcycle 2 or may be mounted on the terminal device 10.

Note that besides the temperature sensor 43, other sensors, which are capable of acquiring pieces of outside information, such as a humidity sensor, an atmospheric pressure sensor, and an altitude sensor may be added.

The outside environment microphone 44 picks up external sound around the motorcycle 2 and outputs the picked-up external sound to the outside information acquisition part 21 as external sound information. The outside environment microphone 44 may be mounted on the motorcycle 2 or may be mounted on the terminal device 10.

In addition, the spot information acquisition part 23 acquires a current spot of the motorcycle 2, which is acquired from a GPS device 45. The GPS device 45, not shown, includes heretofore known units such as a GPS antenna which receives radio waves from satellites, an orientation sensor (gyroscope sensor), a vehicle speed sensor, and map data.

As the map data, beside the road information, gas station information, information pertinent to commercial facilities such as supermarkets and convenience stores, information pertinent to eating and drinking houses such as restaurants, and rail station information are included. Furthermore, in the present embodiment, as the map data, information pertinent to artifact facilities such as sightseeing areas (picturesque places), information pertinent to natural landscapes such as locations having nice landscapes, and the like are included.

Sent to the biological information acquisition part 22 is biological information outputted from a biological information detection part 50.

The biological information detection part 50 includes a face camera 51, a body temperature sensor 52, a pulse sensor 53, a sweating sensor 54, and a blood pressure sensor 55.

The face camera 51 is to shoot expression of the user 3 and may be mounted inside the helmet or may be mounted on the motorcycle 2 or the terminal device 10.

The body temperature sensor 52 detects a body temperature of the user 3. The pulse sensor 53 detects a pulse of the user 3. The sweating sensor 54 detects a sweating state of the user 3. The blood pressure sensor 55 detects a blood pressure of the user 3.

As the body temperature sensor 52, the pulse sensor 53, and the sweating sensor 54, heretofore known vital sensors or the like can be applied. These body temperature sensor 52, pulse sensor 53, and sweating sensor 54 may be configured as one unit or may be configured respectively individual sensors.

The biological information acquisition part 22 analyzes images sent from the face camera 51, thereby acquiring the expression of the user 3, for example, which is expression of joy or expression of tension. In addition, based on detection results sent from the body temperature sensor 52, the pulse sensor 53, the sweating sensor 54, and the blood pressure sensor 55 of the biological information detection part 50, biological information of the user 3 is acquired.

Note that sensors of the biological information detection part 50 are not limited to the above-mentioned sensors, and any biological sensor can be used as needed.

Note that the above-described terminal device 10 may be mounted on the motorcycle 2 or may be a terminal device 10 which is portable, for example, like a smartphone, a tablet terminal, or the like. Further, the GPS device 45 may be configured to have a function as the terminal device 10.

Next, the server 60 will be described.

As shown in FIG. 2, the server 60 includes a server side communication part 61, a server side control part 62, and a server side storage part 63.

The server side communication part 61 performs communication processing in accordance with the wireless communication protocol under control of the server side control part 62, thereby performing communication with a plurality of terminal devices 10 via the communication network 25 (FIG. 1).

The server side control part 62 has a processor having a high processing capability than that of the terminal side control part 12 of the terminal device 10 and executes programs stored in the server side storage part 63, thereby functioning as a computer unit which controls each part of the server 60 and performs processing for realizing a variety of kinds of functions.

This server side control part 62 includes one component or a plurality of components which utilize an artificial intelligence (AI) technology, thereby functioning as artificial intelligence. The server side control part 62 functions as the artificial intelligence, whereby an estimation function for estimating emotion of each user 3 based on pieces of information from each of the terminal devices 10 and an information provision function for proposing a route in accordance with emotion of each user 3 in accordance with estimation results are realized.

As the artificial intelligence technology, for example, image processing technologies such as a variety of kinds of filtering, independent component analyses, SVMs (Support Vector Machines), and contour extraction; machine learning such as pattern recognition (for example, voice recognition, face recognition, and the like), natural language processing, knowledge information processing, reinforcement learning, a Bayesian network, an SOM (self-organizing map), a neural network, and deep learning (hierarchical learning); and the like are employed. In addition, the estimation, the determination to provide information (including each response to an instruction), and the like on the server side control part 62 are performed based on algorithm previously obtained by the machine learning and the like.

As the server side storage part 63, a heretofore known storage device is widely applicable, and the server side storage part 63 has stored therein programs required in order for the server 60 to perform a variety of kinds of processing and data such as the algorithm used by the server side control part 62. As kinds of the algorithm, for example, an emotion detection algorithm for detecting emotion, a route proposition algorithm for proposing a route suited for the user 3, a browsing information generation algorithm for generating browsing information, and the like are included.

The server side storage part 63 includes an emotion information database (emotion information DB) 64 as emotion information record means, a route information database (route information DB) 65, and a browsing information database (browsing information DB) 66 as browsing information record means.

The server side control part 62 includes an emotion detection part 70 as emotion detection means, a route proposition part 71 as route proposition means, and a browsing information generation part 72 as browsing information generation means.

The emotion detection part 70 inputs the driving information, the outside information, the biological information, and the spot information sent from the terminal device 10 thereto and based on the expression of the user 3 acquired by the face camera 51 and the biological information such as a body temperature and a pulse, detects emotion of the user 3. In other words, the emotion detection part 70 detects what emotion the user 3 has in what outside situation by employing the artificial intelligence technology using the emotion detection algorithm.

As kinds of emotion, for example, there are positive emotion such as joy, delight, a feeling of happiness, and relaxing and negative emotion such as toilsomeness, fear, anxiety, anger, and antipathy.

The emotion detection part 70 is to detect in what kinds of outside situation the above-mentioned positive emotion or negative emotion is expressed.

By also using the biological information acquired by the biological information acquisition part 22, in consideration of the biological information such as expression, a pulse, a blood pressure, expression, and an amount of sweating of the user 3, emotion can be detected, and emotion estimation at high precision similar to that at which a human determines emotion estimation is facilitated, thereby allowing the detection at the high precision to be made.

Note that when an unexpected outside factor is caused and emotion is thereby changed, by detecting a difference of emotion based on an expected outside factor, the emotion detection part 70 may weight a detection result of emotion.

The emotion detection part 70 detects emotion that depends on an outside situation, such as the case where based on an image shot by the front camera 41, when that other running vehicle is not present, the emotion becomes positive or not, or when other running vehicle is present in front, the emotion becomes rather positive or not, or the case where based on an image shot by the front camera 41, when driving is made on a linear road such as an expressway as a road condition, the emotion becomes positive or not, or when driving on a road, such as a mountain pass, on which many curves are present, the emotion becomes positive or not, or otherwise the emotion becomes negative due to feeling toilsomeness (stress) through cautious driving or not, or the case where based on an image shot by the rear camera 42, when other running vehicle is present in the rear, the emotion becomes negative due to feeling tension and stress or not.

In addition, the emotion detection part 70 also detects emotion in accordance with a driving state based on the driving information. For example, when a throttle opening or the like is substantially constant and there is no large change in a driving operation, it can be estimated that the user 3 is driving relaxedly or when the driving operation such as the throttle opening, the brake operation or the like abruptly changed, it can be estimated that some external factor is applied to the user 3 and stress is thereby exerted on the user 3.

In addition, based on the information pertinent to an artifact facility and a landscape acquired from the map data based on information pertinent to a landscape or a spot shot by the front camera 41, the emotion detection part 70 detects whether the landscape of the spot where driving is made causes emotion to be positive or negative. Further, based on weather acquired by the front camera 41 or the like or a temperature detected by the temperature sensor 43, the emotion detection part 70 detects what kind of emotion is caused by the weather or the temperature. Based on external sound information picked up by the outside environment microphone 44, the emotion detection part 70 detects what kind of external sound causes what kind of emotion by the external sound during driving.

Note that these are all merely illustrative and the ways of detection of the emotion based on the outside situation are not limited to these.

As described above, based on the outside information or the spot information, the emotion detection part 70 detects how the biological information and the driving information change.

Based on the detected emotion information, the emotion detection part 70 sets emotion kinds. Since as the emotion, the positive emotion and the negative emotion are present as described above, the emotion detection part 70 determines the emotion kinds on whether the detected emotion information indicates the positive emotion or the negative emotion. When the detected emotion information indicates the positive emotion, the emotion detection part 70 sets a positive flag, and when the detected emotion information indicates the negative emotion, the emotion detection part 70 sets a negative flag.

After determining the emotion kinds, the emotion detection part 70 associates these emotion kinds with the outside information and the spot information and records the emotion kinds associated with the outside information and the spot information in the emotion information database 64.

Figure 3:
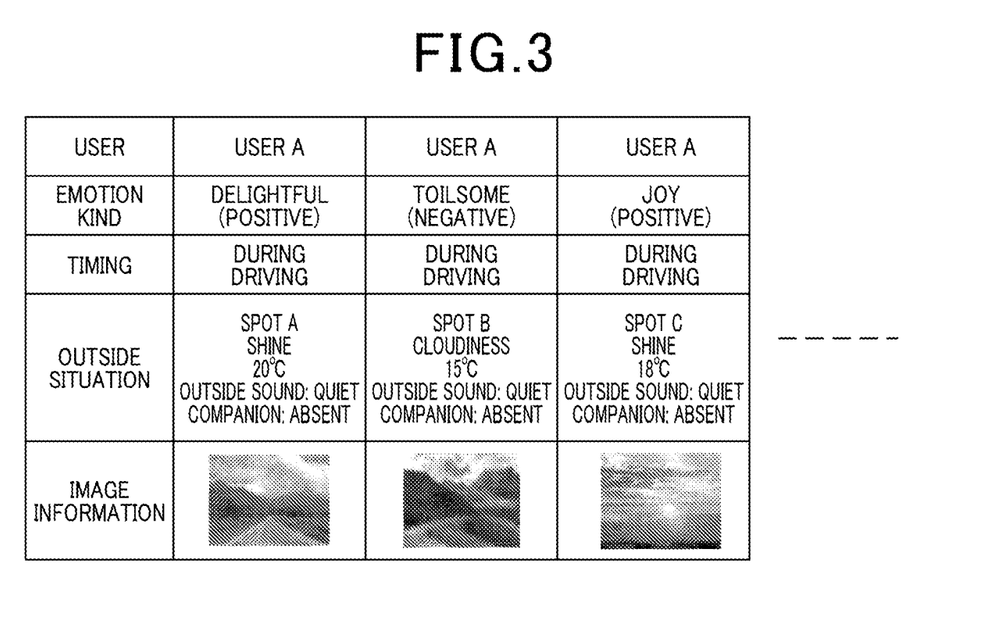
FIG. 3 is a table showing a record example of emotion information.

FIG. 3 is a table showing an example of the emotion information recorded in the emotion information database 64.

As shown in FIG. 3, in the emotion information database 64, each of the emotion kinds of the user 3 (in this example, a "user A") is associated with weather, an outside air temperature, an external sound, and presence or absence of a companion or companions which are pieces of outside information, image information acquired by the front camera 41, and the spot information.

When the user 3 drives the motorcycle 2, invariably, the emotion detection part 70 detects the emotion of the user 3 and thus, associates the outside information and the spot information with the emotion kinds, thereby storing the emotion kinds associated with the outside information and the spot information in the emotion information database 64.

As described above, the pieces of the emotion information of the user 3 are accumulated, thus allowing the emotion detection part 70 to determine preference of the user 3 based on the accumulated emotion information. For example, preference and personality of the user 3 in which the positive emotion is easily caused when other running vehicle is not present and the user 3 is driving relaxedly or the positive emotion is easily caused in a spot where a natural scenery is beautiful can be determined. As the personality of the user 3, for example, a person of action, a person of cautiousness, a person of competitive, and the like are considered. Note that the personality of the user 3 is determined not only by the emotion detection part 70, but the personality of the user 3 may be accumulated as personality information through inputting by the user 3 himself or herself, evaluation from other user or users 3, and the like.

In this case, when determining the emotion kinds, the emotion detection part 70 may determine emotion levels. For example, when emotion levels are set to five levels, emotion kinds are further classified with the emotion levels of slight joy (positive level 1) to great joy (positive level 5) and slight toilsomeness (negative level 1) to great toilsomeness (negative level 5).

As described above, in consideration of the emotion levels, the emotion kinds are classified, thereby allowing further detailed preference and personality of the user 3 to be determined.

In addition, besides the above-described emotion levels, it is also made possible to accumulate outside information, obtained when an amount of change in each of the emotion levels exceeds a certain predetermined level, together with the amount of change in the emotion information database 64. For example, spot information obtained when the emotion of the user 3 has switched from any one of the negative levels 1 to 5 to the positive level 5 can be accumulated as information having a positive level higher than a level of spot information whose level has switched from the positive level 3 to the positive level 5.

Based on the emotion information accumulated in the emotion information database 64, the route proposition part 71 sets a route suited for preference of the user 3 and proposes the set route. The proposition of the route is started, for example, when the user 3 operates the operation part 16 of the terminal device 10 and issues an instruction of the route proposition.

The route proposition part 71 sets targeted emotion kinds from a departure spot to a final guiding spot. At this time, as the departure spot, a spot where the terminal device 10 is currently located may be set, or the user 3 himself or herself may input the departure spot by using the operation part 16 of the terminal device 10. In addition, the user 3 himself or herself may input the final guiding spot by using the operation part 16 of the terminal device 10 or the user 3 may perform no inputting and the route proposition part 71 may be caused to be responsible therefor.

Figure 4:
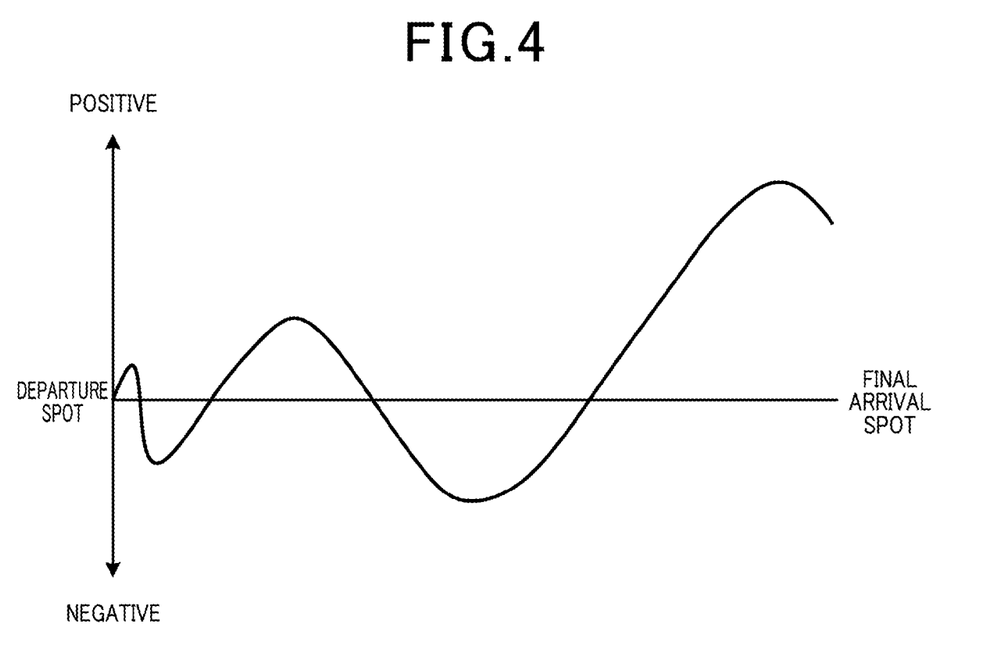
FIG. 4 is a graph showing an example in which targeted emotion kinds are set.

FIG. 4 is a graph showing an example in which the targeted emotion kinds from the departure spot to the final guiding spot are set.

In the example shown in FIG. 4, slight positive emotion (for example, a positive level 1) is set immediately after starting from a departure point; and thereafter, negative emotion (for example, a negative level 1) is set; thereafter, slightly large positive emotion (for example, a positive level 2) is consecutively set; thereafter, slightly large negative emotion (for example, a negative level 3) is consecutively set; and finally, large positive emotion (for example, a positive level 5) is set.

This setting of the targeted emotion kinds is merely one example, and any targeted emotion kinds can be set.

Of course, it is possible to set all of the emotion kinds from the departure spot to the final guiding spot to be positive. However, for example, even in a case in which the emotion kind is the negative emotion such as the toilsomeness, thereafter, when the toilsome situation is overcome, depending on personality of the user 3, it may occur that negative emotion shifts to the positive emotion by a feeling of accomplishment.

Therefore, in accordance with the personality of the user 3 determined based on the pieces of the emotion information recorded in the emotion information database 64, the route proposition part 71 sets the targeted emotion kinds.

Note that the route proposition part 71 may set a plurality of emotion kinds from the departure spot to the final guiding spot. For example, a route with setting in which comparatively many positive emotion kinds are expressed, a route with setting in which comparatively many negative emotion kinds are expressed, a route with setting in which only positive emotion kinds are expressed, and the like are proposed, and the user 3 may make a choice from thereamong.

At this time, it is preferable that among the emotion kinds set by the route proposition part 71, in a final arrival spot which is the final guiding spot, the emotion kind is set to invariably end in the positive emotion with the positive flag set.

In addition, for the targeted emotion kinds set by the route proposition part 71, the personality of the user 3 may be taken into consideration. In this case, as described above, based on the personality information determined by the emotion detection part 70, the route proposition part 71 sets personality kinds of the user 3. In other words, for example, the personality of the user 3 is classified into personality kinds such as active personality and cautious personality.

The route proposition part 71 sets the targeted emotion kinds based on emotion information of another user 3 having the same personality kind as a personality kind of the user 3. Through the above-mentioned setting, it is made possible to set targeted emotion kinds in accordance with the personality of the user 3.

After setting the targeted emotion kinds, the route proposition part 71 sets a route which achieves the targeted emotion kinds.

Based on the set targeted emotion kinds, the route proposition part 71 sets a route on which the targeted emotion kinds set by using the map data of the GPS device 45 are expressed. For example, based on emotion information recorded in the emotion information database 64 and spot information associated with this emotion information, spots which achieve the targeted emotion kinds are searched and chosen as spot candidates.

The route proposition part 71 sets an optimum route from the departure spot to the final guiding spot, from among the chosen spot candidates.

In addition, besides the route setting based on the emotion information recorded in the emotion information database 64, the route proposition part 71 may set a route on which a spot where the user 3 has never visited is included.

In this case, based on the emotion information recorded in the emotion information database 64, the route proposition part 71 estimates an outside situation in which similar emotion kinds are expressed and predicts a spot where this outside situation is likely to occur. The route proposition part 71 sets a route on which the predicted spot is included.

In addition, the outside situation such as the weather and the temperature associated with the emotion information recorded in the emotion information database 64 does not necessarily match the outside situation upon setting the route.

Therefore, the route proposition part 71 predicts emotion caused by change in the outside situation. For example, in a case in which emotion information indicates positive emotion in an outside situation with shine and a temperature of 20° C., when the outside situation upon setting the route is an outside situation with cloudiness and a temperature of 10° C., with reference to other emotion information in an outside situation similar thereto, the route proposition part 71 predicts whether emotion becomes the positive emotion or the negative emotion and determines whether or not the emotion information is utilized for setting a route.

Further, when the route on which the spot where the user 3 has never visited is included, based on emotion information of another user 3, the route proposition part 71 may choose a spot where the other user 3 has the positive emotion or a spot where the other user 3 has the negative emotion and may set a route. When in the emotion information database 64 of the server 60, a large amount of emotion information is recorded, the emotion information of the other user 3 can also be referenced.

In addition, information pertinent to weather, a temperature, or presence or absence of other running vehicle on a route to be set may be determined, for example, by acquiring, via the communication network 25, information on a weather site, a traffic information site, and the like on the Internet. Alternatively, by using big data acquired from the other running vehicle, fixed-point cameras, and the like, the above-mentioned information pertinent thereto may be determined.

Since the targeted emotion kinds are set from the departure spot to the final guiding spot as described above and the route is set based on the targeted emotion kinds, a route can be set so as to produce emotional ups and downs, and the user 3 can drive on a route on which the user 3 feels a story.

After completing the setting of the route by the route proposition part 71, the route proposition part 71 transmits the proposed route via the communication part to the terminal device 10 and causes the display part 14 of the terminal device 10 to display the proposed route. Thus, the user 3 can confirm the route set by the route proposition part 71. This confirmation is made via the operation part 16.

In this case, the route proposition part 71 may propose a plurality of routes. The route proposition part 71 causes the display part 14 to display the plurality of routes, and the user 3 may make a choice by using the operation part 16. In addition, as the proposed route, a route guided to a plurality of spots with which different targeted emotion kinds are associated may be proposed.

When the route or routes are confirmed or chosen by the user 3, the information on the route is sent from the terminal device 10 via the communication part to the server 60 and is recorded in the route information database 65 of the server 60.

In addition, for example, in a case in which a plurality of users 3 drive on the same route in touring or the like, application is possible.

In this case, biological information of each of the plurality of users 3 is acquired by the biological information acquisition part 22 of the terminal device 10 and is transmitted via the terminal side communication part 11, the communication network 25, and the server side communication part 61 to the server 60.

The emotion detection part 70 of the server 60 detects emotion information of each of the users 3, the emotion information is associated with outside information for each of the users 3 and is recorded in the emotion information database 64.

Subsequently, as in the case in which one user 3 is present, the route proposition part 71 sets targeted emotion kinds. In this case, the targeted emotion kinds are prepared based on the emotion information of each of the plurality of users 3. However, it is considered that spots where emotion kinds are positive or spots where emotion kinds are negative are different from one another among the users 3.

Therefore, as described above, based on personality kinds of the users 3, the targeted emotion kinds may be set. In other words, based on emotion information of the users 3 having a high rate of a personality kind (for example, in a case in which a large number of users 3 having active personality are present), the targeted emotion kinds are set.

In addition, based on the pieces of emotion information recorded in the emotion information database 64, the route proposition part 71 may choose, for example, a spot where a rate of all of the users 3 who have the positive emotion is high or a spot where a rate of all of the users 3 who have the negative emotion is high as a spot with the positive emotion or a spot with the negative emotion. Also in this case, a route which includes a spot or spots where the users 3 have never visited may be set.

Based on the set targeted emotion kinds, the route proposition part 71 searches spots where emotion kinds become the targeted emotion kinds and chooses the spots as spot candidates. With reference to the chosen spot candidates, the route proposition part 71 sets an optimum route from the departure spot to the final guiding spot.

The route set as described above can be a route which is enjoyable for some of the users 3 but also can be a route which is toilsome for another user 3. Therefore, for the user 3 who might have the negative emotion on the whole of the route, adjustment in accordance with the above-mentioned user 3, such as setting of a route on which many spots where emotion of the above-mentioned user 3 becomes positive are included, can be made.

When the pieces of emotion information detected by the emotion detection part 70 have become predetermined emotion kinds, the browsing information generation part 72 generates browsing information and records the generated browsing information in the browsing information database 66.

As described above, as the emotion kinds, there are the positive emotion and the negative emotion, and when emotion levels change and exceed a predetermined range, the browsing information is generated. For example, when an emotion level of the positive emotion changes and exceeds a predetermined value or an emotion level of the negative emotion changes and exceeds a predetermined value, the browsing information is generated. In addition, for example, when the negative emotion is changed to the positive emotion or conversely, when the positive emotion is changed to the negative emotion, the browsing information is generated.

The browsing information is generated by, mainly, associating images shot by the front camera 41 and the rear camera 42 with the emotion information. In this case, each of the images may be a still image or may be a moving image.

As the browsing information, only images of spots where the emotion kinds become predetermined emotion kinds may be generated. Further, for example, when the user 3 drives on a route proposed by the route proposition part 71, images of spots where the emotion kinds become the predetermined emotion kinds during driving on the route may be sequentially recorded and after driving on the route, the images of the spots may be automatically edited to be generated as a series of moving images in the driving on the set route.

The browsing information generation part 72 transmits the generated browsing information via the server side communication part 61, the communication network 25, and the terminal side communication part 11 to the terminal device 10.

To not only the terminal device 10 of the user 3 who is targeted for detecting the emotion information but also the terminal device 10 of each of the other users 3, the generated browsing information is transmitted. The user 3 chooses or designates the user 3 or users 3 or the terminal device 10 or terminal devices 10 to which the generated browsing information should be transmitted, for example, by operating the operation part 16.

When the user 3 (a browser) is browsing the transmitted browsing information, the terminal device 10 acquires biological information of the browser by the biological information acquisition part 22. The acquired biological information is sent via the terminal side communication part 11, the communication network 25, and the server side communication part 61 to the server 60. The emotion information is detected by the emotion detection part 70.

In other words, in this case, the emotion information of the browser can be detected. Thus, emotion kinds of the browser regarding the browsing information can be determined. The emotion detection part 70 can determine whether the emotion kinds of the browser are positive or negative, and these are also associated as the browser emotion information with the browsing information to be recorded in the emotion information database 64.

Figure 5:
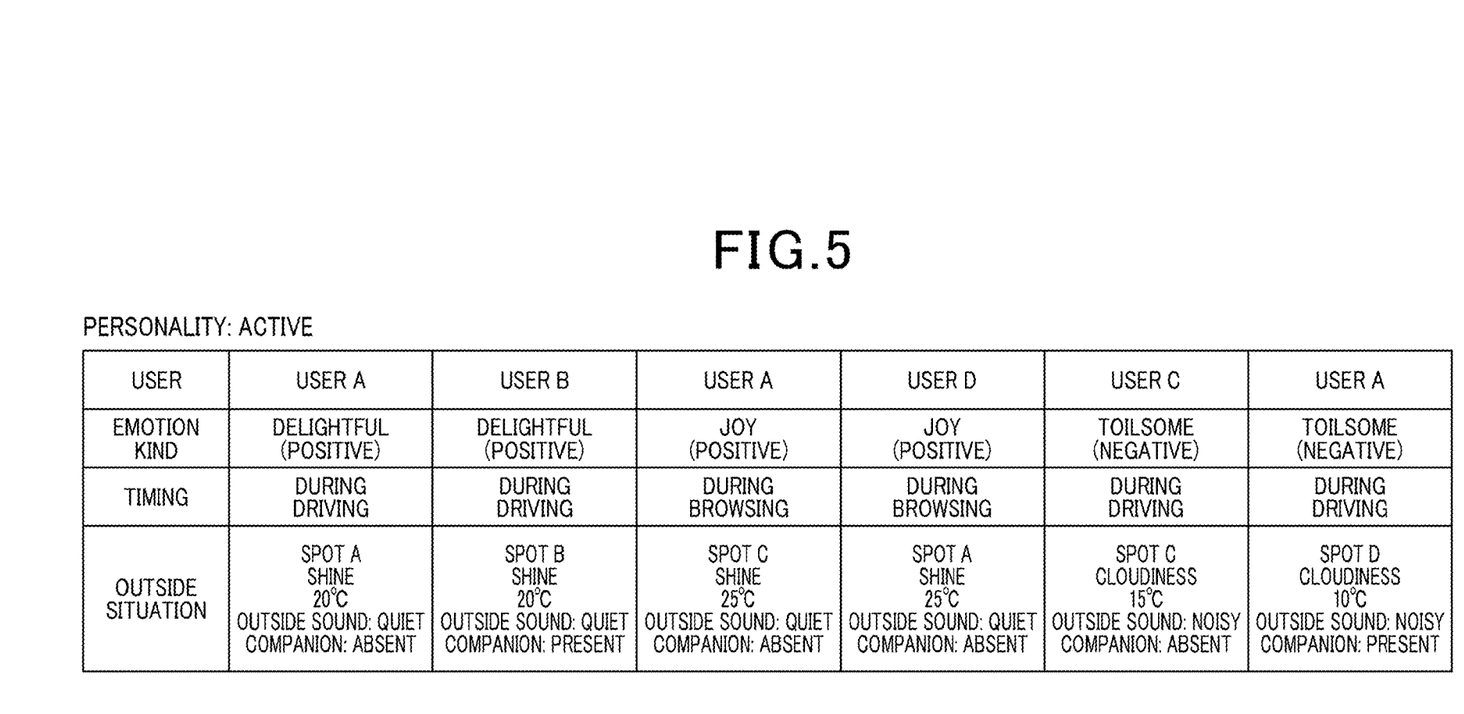
FIG. 5 is a table showing another example in which targeted emotion kinds are set.

FIG. 5 is a table showing an example of recording in the emotion information database 64.

As shown in FIG. 5, in the emotion information database 64, the emotion kind of each of the users 3 (a "user A" to a "user D") is associated with a spot, weather, an outside air temperature, external sound, presence or absence of a companion or companions, which are pieces of the outside information, and timing at which the emotion information is acquired (during driving or during browsing).

As described above, the emotion information of not only the user who is driving but also a user or users who are browsing the browsing information is recorded in the emotion information database 64, thereby allowing the above-mentioned emotion information to be utilized for subsequently setting a route.

Next, operations of the present embodiment will be described.

Figure 6:
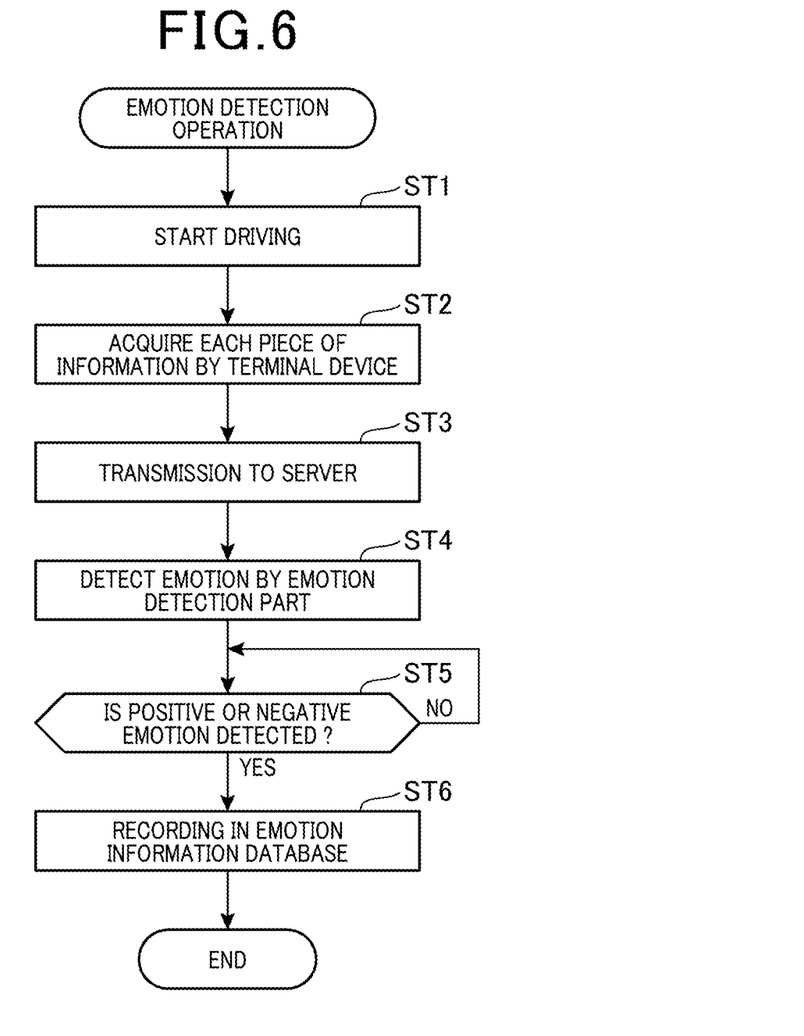
FIG. 6 is a flowchart showing an emotion detection operation.

FIG. 6 is a flowchart showing operations performed when the emotion information is detected.

As shown in FIG. 6, first, when the user 3 starts driving of the motorcycle 2 (ST1), the terminal device 10 starts, under the control of the terminal side control part 12, acquiring of the driving information from the driving information acquisition part 20, the outside information from the outside information acquisition part 21, the biological information from the biological information acquisition part 22, and the spot information from the spot information acquisition part 23 (ST2). These pieces of information are transmitted in real time, under the control of the terminal side control part 12, via the terminal side communication part 11, the communication network 25, and the server side communication part 61 to the server 60 (ST3).

When the pieces of information have been transmitted, based on the pieces of information transmitted from the terminal device 10, the emotion detection part 70 of the server 60 detects the emotion of the user 3 in real time (ST4).

When the positive emotion or negative emotion of the user 3 has been detected (ST5: YES), the emotion information is associated with the outside information and the spot information and the emotion information associated therewith is recorded in the emotion information database 64 (ST6).

Figure 7:
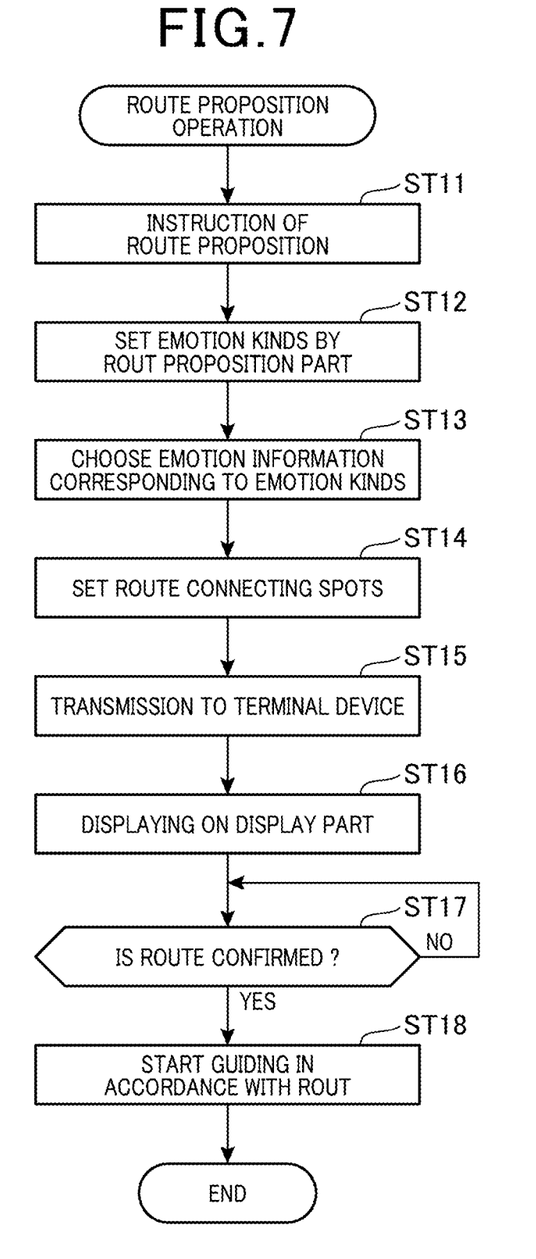
FIG. 7 is a flowchart showing a route proposition operation.

FIG. 7 is a flowchart showing operations upon proposing a route.

As shown in FIG. 7, when the user 3 operates the operation part 16 of the terminal device 10 and issues an instruction for the route proposition (ST11), the route proposition part 71 sets targeted emotion kinds (ST12).

After setting the targeted emotion kinds, based on the emotion information recorded in the emotion information database 64 and the spot information, the route proposition part 71 searches spots where emotion kinds become the targeted emotion kinds and chooses the spots as spot candidates (ST13).

From the chosen spot candidates, the route proposition part 71 sets an optimum route from a departure spot to a final guiding spot (ST14).

After completing setting of the route by the route proposition part 71, the route proposition part 71 transmits the proposed route via the server side communication part 61, the communication network 25, and the terminal side communication part 11 to the terminal device 10 (ST15) and causes the display part 14 of the terminal device 10 to display the proposed route (ST16).

After the user 3 has confirmed the route (ST17: YES), in accordance with the route proposed by the route proposition part 71, the terminal device 10 starts route guiding by using the GPS device 45 (ST18).

Figure 8:
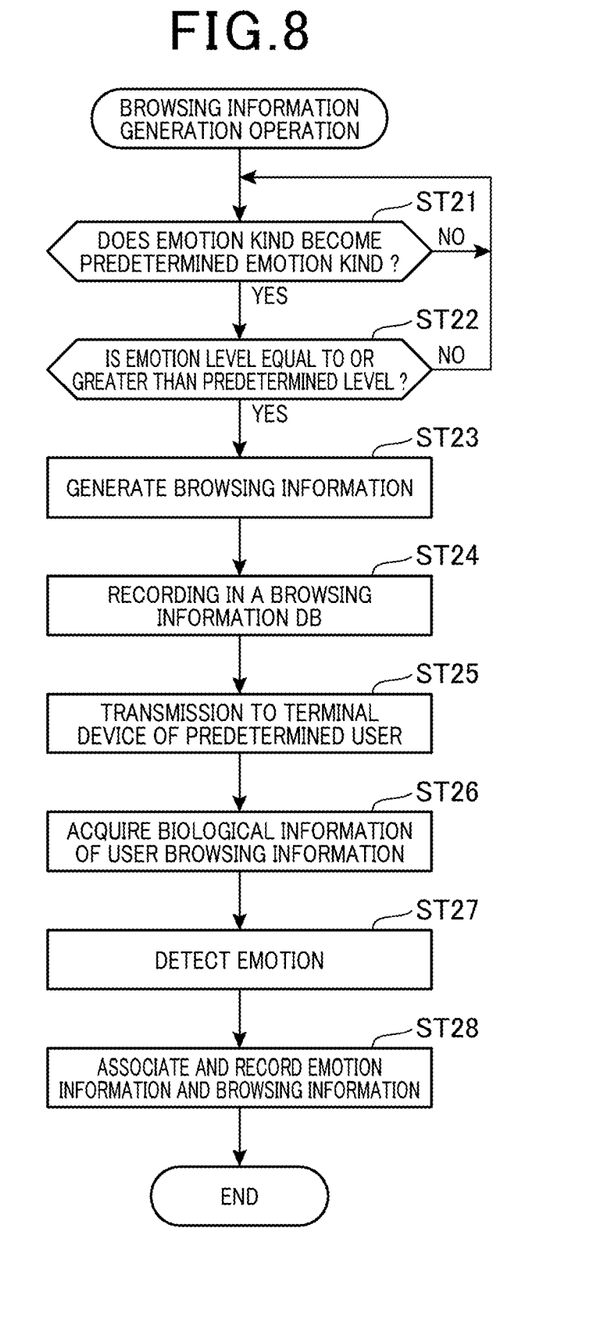
FIG. 8 is a flowchart showing a browsing information generation operation.

FIG. 8 is a flowchart showing operations upon generating the browsing information.

As shown in FIG. 8, when the emotion information detected by the emotion detection part 70 becomes predetermined emotion kinds (ST21: YES), the browsing information generation part 72 determines whether or not an emotion level of the emotion kinds is equal to or greater than a predetermined level (ST22). When this emotion level of the emotion kinds is equal to or greater than the predetermined level (ST22: YES), the browsing information is generated (ST23) and is recorded in the browsing information database 66 (ST24).

The browsing information generation part 72 transmits the generated browsing information via the server side communication part 61, the communication network 25, and the terminal side communication part 11 to the terminal device 10 of a predetermined user 3 (ST25).

When the user 3 is browsing the transmitted browsing information, the terminal device 10 acquires biological information of the browser by the biological information acquisition part 22 (ST26), and the acquired biological information is sent via the terminal side communication part 11, the communication network 25, and the server side communication part 61 to the server 60, and emotion is detected by the emotion detection part 70 (ST27). The emotion detection part 70 can determine emotion kinds of the browser, and these emotion kinds are also associated as browser emotion information with the browsing information and are recorded in the emotion information database 64 (ST28).

As described hereinbefore, in the present embodiment, the route proposition part 71 (route proposition means) which proposes the route based on the emotion information detected by the emotion detection part 70 (emotion detection means) which detects the emotion of the user 3 and the spot information associated with the emotion information is included, and the route proposition part 71 sets the targeted emotion kinds from the departure spot to the final guiding spot and based on the emotion information and the spot information, and proposes the route including the spots corresponding to the set emotion kinds.

Thus, the route which passes through the spots achieving the targeted emotion kinds can be proposed to the user 3. As a result, the route can be set so as to produce the emotional ups and downs, and the user 3 can drive on the route on which the user 3 feels a story.

In the present embodiment, the emotion information database 64 (emotion information record means) in which the emotion information, the spot information, and the outside information are recorded so as to be associated with one another is included. Based on the outside information associated with the emotion kinds, the route proposition part 71 proposes the route passing through the spots with the outside situation associated with the targeted emotion kinds achieved.

Thus, the route with the outside situation in which emotion kinds become the targeted emotion kinds can be proposed to the user 3.

In the present embodiment, based on the pieces of emotion information of the plurality of users 3, the route proposition part 71 sets the personality kind of each of the plurality of users 3, and based on the emotion kind or emotion kinds of the other user 3 or users 3 whose personality kinds are the same as the targeted user 3, the route proposition part 71 sets the targeted emotion kinds.

Thus, in accordance with the personality kind of the user 3, a large amount of the spot information associated with the emotion kinds can be collected, and the route based on the large amount of the spot information can be proposed.

In the present embodiment, the route proposition part 71 proposes the route passing through the plurality of spots associated with the targeted emotion kinds being different from one another.

Thus, the route can be proposed such that one route achieves different emotion kinds.

In the present embodiment, for each of the emotion kinds, the positive flag or the negative flag is set, and among the spots, the spot with the positive flag set is set as the final guiding spot.

Thus, the route which includes the final guiding spot in which the user 3 has the positive emotion can be proposed.

In the present embodiment, the emotion information database 64 (emotion information record means) which records the emotion information detected by the emotion detection part 70 (emotion detection means) which detects the emotion of the user 3 and the outside information associated with the emotion information and the browsing information generation part 72 (browsing information generation means) which generates the browsing information based on the outside information when a predetermined emotion kind is detected by the emotion detection means are included.

Thus, the browsing information in which the outside information is recorded at the time of having the predetermined emotion kinds can be obtained.

In the present embodiment, the emotion detection part 70 detects an emotion level for each emotion kind, and the browsing information generation part 72 generates the browsing information when the emotion level changes and exceeds a predetermined range.

Thus, the browsing information in which the outside information with the emotion level exceeding the predetermined value is recorded can be obtained.

In the present embodiment, the browsing information generation part 72 transmits the generated browsing information to another user 3 who is different from the user 3.

Thus, the different user 3 can confirm the browsing information with the emotion level exceeding the predetermined value.

In the present embodiment, the emotion detection part 70 detects for each emotion kind, an emotion of the different user 3 who is browsing the outside information, and when the emotion becomes a predetermined emotion kind, the emotion information of the different users 3 is associated with the outside information and is recorded in the emotion information database 64

Thus, the browsing information can be associated with the emotion information of another user 3 who is browsing the browsing information and the outside information and can be recorded.

Note that the above-described embodiment is merely one mode of the present invention, and modifications and application can be made without departing from the scope of the present invention.

For example, in the above-described embodiment, the case in which the information provision system is constituted of the terminal device 10 and the server 60 which can communicate with the terminal devices 10 is described. However, the present invention is not limited thereto, and the terminal device 10 may have functions of the emotion detection part 70, the route proposition part 71, and the browsing information generation part 72, and may be constituted of a single terminal device 10 that can communicate with another terminal device 10.

In addition, in the above-described embodiment, the case of the motorcycle 2 as one example of the vehicle is described. However, the present invention is not limited thereto, and the present invention is applicable to a variety of vehicles such as a scooter-type vehicle; a saddle-riding-type vehicle such as a three-wheeled vehicle and a four-wheeled vehicle, such as ATVs; an automobile; and a bicycle.

REFERENCE SIGNS LIST 1 information provision system
2 motorcycle
3 user
10 terminal device
11 terminal side communication part
12 terminal side control part
20 driving information acquisition part
21 outside information acquisition part
22 biological information acquisition part
23 spot information acquisition part
25 communication network
40 outside information detection part
45 GPS device
50 biological information detection part
60 server
61 server side communication part
62 server side control part
63 server side storage part
64 emotion information database
65 route information database
66 browsing information database
70 emotion detection part
71 route proposition part
72 browsing information generation part

The invention claimed is:

1. An information provision system comprising a processor and a storage device, wherein
the processor is configured to:
  detect emotion of a user and obtain information about outside of the user when the emotion is detected, record emotion information with the outside information in the storage device, the emotion information representing the detected emotion of the user, and the outside information representing the information about an external environment around the user and being associated with the emotion information; and
  generate browsing information based on the outside information when a predetermined emotion kind is detected, and wherein
the processor is further configured to:
  detect an emotion level for each emotion kind,
  generate the browsing information when the emotion level changes and exceeds a predetermined range, and
  transmit the generated browsing information to another user being different from the user.

2. The information provision system according to claim 1, wherein the processor detects for each emotion kind, an emotion of the other user being different from the user and browsing the outside information and when the emotion becomes a predetermined emotion kind, the processor associates emotion information of the other user being different from the user with the outside information and records the emotion information associated with the outside information in the storage device.

3. A server comprising a processor, a storage device, and a communication device performing transmission and reception to and from a terminal device of a user, wherein
the processor is configured to:
  detect emotion of a user and obtain information about outside of the user when the emotion is detected;
  record emotion information with outside information in the storage device, the emotion information representing the detected emotion of the user, and the outside information representing the information about an external environment around the user and being associated with the emotion information;
  generate browsing information based on the outside information when a predetermined emotion kind is detected; and wherein
the processor is further configured to:
  receive the emotion information through the communication device from the terminal device of the user,
  detect an emotion level for each emotion kind,
  generate the browsing information when the emotion level changes and exceeds a predetermined range, and
  transmit the generated browsing information from the communication device to a terminal device of another user being different from the user.

* * * * *